(12) United States Patent
Fahrni, Jr. et al.

(10) Patent No.: US 7,393,141 B2
(45) Date of Patent: Jul. 1, 2008

(54) BEARING ARRANGEMENT FOR A VEHICLE DIFFERENTIAL

(75) Inventors: Glenn R. Fahrni, Jr., Dalton, OH (US); David L. Milam, North Canton, OH (US); Michael F. Marcelli, White Lake, MI (US); Christopher S. Marks, Columbus, OH (US); Kofi P. Obeng, Canton, OH (US); Scott D. Russell, East Sparta, OH (US); Byron Roubanes, Stone Creek, OH (US); Gary A. Stoffer, Minerva, OH (US)

(73) Assignee: The Timken Company, Canton, OH (US)

( * ) Notice: Subject to any disclaimer, the term of this patent is extended or adjusted under 35 U.S.C. 154(b) by 247 days.

(21) Appl. No.: 10/669,180

(22) Filed: Sep. 22, 2003

(65) Prior Publication Data

US 2005/0063629 A1 Mar. 24, 2005

(51) Int. Cl.
*F16C 23/00* (2006.01)
*F16C 25/00* (2006.01)
*F16C 43/00* (2006.01)
(52) U.S. Cl. .................. 384/583; 384/537; 384/540
(58) Field of Classification Search ................ 384/540, 384/519, 571, 569, 583, 562, 559, 585, 537, 384/564, 584; 74/396, 406, 409; 475/220, 475/230; 411/372.5, 376, 409
See application file for complete search history.

(56) References Cited

U.S. PATENT DOCUMENTS 1,363,705 A * 12/1920 Andrus ..................... 384/519

(Continued)

FOREIGN PATENT DOCUMENTS

EP 1367298 A1 12/2003

(Continued)

OTHER PUBLICATIONS

PAI® Parts "Catalog and Cross Reference", 1996, pp. 70, 71.

(Continued)

*Primary Examiner*—Thomas R. Hannon
*Assistant Examiner*—Justin Krause
(74) *Attorney, Agent, or Firm*—Polster, Lieder, Woodruff & Lucchesi L.C.

(57) ABSTRACT

A vehicle differential includes a housing having bearing seats and a carrier provided with stub shafts which project into the bearing seats. The carrier is supported in the housing on two single row tapered roller bearings which allow the carrier to rotate, but confine it radially and axially. The housing also contains a beveled pinion which meshes with a beveled ring gear that is attached to the carrier. The two bearings are mounted in opposition and each includes a cup that is located in the bearing seat for that bearing, a cone that fits around the stub axle that projects into that bearing seat, and tapered rollers located between the cup and cone. Each bearing seat contains an internal thread and the bearing cup which fits into the seat has an external thread that engages the internal thread. Each cup also carries a locking ring which is engaged by an adjustment tool to turn the cup, but is later deformed into the housing to secure the cup against rotation. By rotating the cups in their bearing seats, one can adjust the setting of the bearings and the mesh setting of the pinion and ring gear.

32 Claims, 6 Drawing Sheets

U.S. PATENT DOCUMENTS

| | | | |
|---|---|---|---|
| 2,588,670 A * | 3/1952 | Terry | 475/246 |
| 3,193,028 A * | 7/1965 | Radzimovsky | 175/372 |
| 4,136,748 A * | 1/1979 | Dickerhoff | 175/337 |
| 4,240,677 A * | 12/1980 | Payne et al. | 384/252 |
| 4,637,806 A * | 1/1987 | Olschewski et al. | 464/130 |
| 5,269,731 A * | 12/1993 | Scudder et al. | 475/230 |
| 5,489,156 A * | 2/1996 | Martinie | 384/538 |
| 5,709,483 A * | 1/1998 | Martinie | 384/538 |
| 6,293,704 B1 | 9/2001 | Gradu | |
| 6,425,690 B1 * | 7/2002 | DeWachter | 384/583 |
| 6,659,651 B1 | 12/2003 | Turner et al. | |
| 7,090,609 B2 * | 8/2006 | Ziech et al. | 475/220 |
| 2002/0183156 A1 | 12/2002 | Gradu et al. | |

FOREIGN PATENT DOCUMENTS

| | | | |
|---|---|---|---|
| JP | 2001-336606 | * | 12/2001 |
| WO | WO02093038 A1 | | 11/2002 |

OTHER PUBLICATIONS

The Timken Company, "Automative Bearing Applications", pp. 28-32.

* cited by examiner

BEARING ARRANGEMENT FOR A VEHICLE DIFFERENTIAL

STATEMENT REGARDING FEDERALLY SPONSORED RESEARCH OR DEVELOPMENT

Not Applicable

BACKGROUND OF THE INVENTION

This invention relates in general to antifriction bearings and more particularly antifriction bearings for vehicle differentials.

The typical differential for an automotive vehicle has a housing in which meshed pinion and ring gears rotate, the former being connected to the transmission for the vehicle and the other being on a differential carrier having stub shafts which rotate in bearings set into the housing. The carrier has a cross shaft on which a pair of beveled gears rotate, and those bevel gears mesh with more bevel gears that are connected to the axle shafts which extend away from the carrier to driven road wheels. The bevel gears connected to the axle shafts have the capacity to rotate within the differential carrier at different angular velocities to compensate for the different angular velocities at which the two axle shafts will rotate when the vehicle negotiates a turn, for example.

Almost universally the two bearings which fit around the carrier shafts to support the carrier are single row tapered roller bearings which are mounted in opposition. As such, the bearings confine the carrier both radially and axially, but nevertheless allow the carrier to rotate in the differential housing with minimal friction. The two bearings are adjusted against one another to a setting which provides a good measure of stability to the carrier—indeed, one in which internal clearances are eliminated from the bearings. The location of the bearings along their common axis controls the mesh setting of the ring gear and the pinion, so the bearings are further adjusted to achieve the correct mesh setting.

Figure 2:
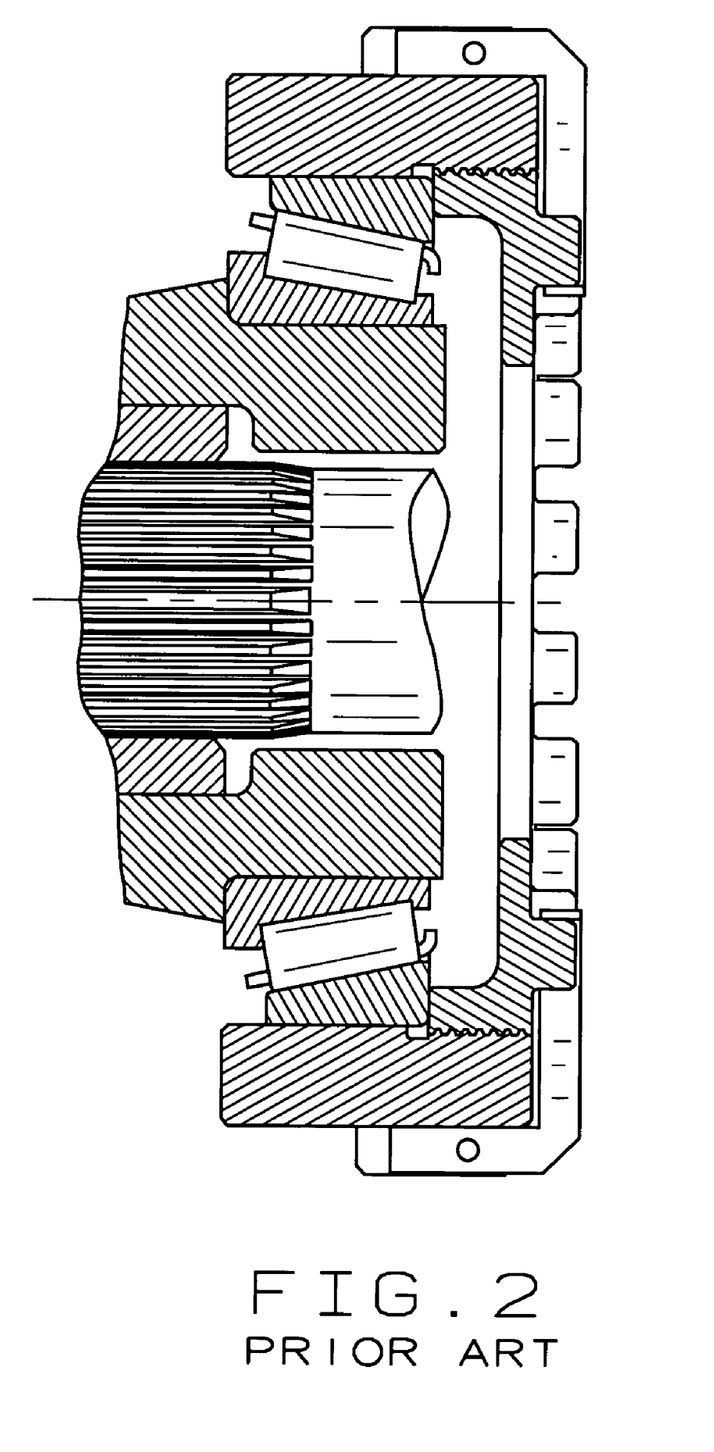
FIG. 2 is a fragmentary sectional view of a conventional differential of the prior art at one of the bearings that supports the ring gear carrier of that differential and further showing a threaded adjustor and locking ring for securing the adjustor.

In the typical differential the cones (inner races) of the two bearings fit around the two stub shafts on the carrier, while the cups (outer races) fit into the housing where they are backed by cup adjustors which thread into the housing (FIG. 2). By turning the two adjustors one can adjust the bearing setting and the mesh setting.

The cup adjustors represent additional components for the differential and add weight to it, as do locking devices which prevent the adjustors from rotating once they are turned to the positions which provide the proper settings. Moreover, the adjustors occupy space within the differential, and that is reflected in increased width and weight for the differential housing. While the adjustors confine the cups of the bearings axially, they do not prevent the cups from rotating in the housing, and such rotation can produce wear in the housing and on the cups as well.

SUMMARY OF THE INVENTION

The present invention resides in a bearing arrangement for a differential, which differential includes a housing that contains bearing seats and a carrier that is located within the housing. The carrier has stub shafts which project into the bearing seats. The bearing arrangement includes single row antifriction bearings which fit around the stub shafts and have outer races that are received in the bearing seats. The outer races have external threads which engage internal threads in the bearing seats. The invention also resides in a threaded cup for a differential bearing combined with a ring attached to the cup so that a tool can engage the cup and rotate it.

DETAILED DESCRIPTION OF INVENTION

Referring now to the drawings, a vehicle differential A (FIG. 1) delivers torque to two axle shafts B which extend out to road wheels to which they are coupled. The differential A enables the axle shafts B to rotate at different angular velocities while delivering torque to both of them, a condition encountered when negotiating turns.

In very basic terms, the differential A includes (FIG. 1) a housing 2, a pinion 4, a ring gear 6 driven by the pinion 4, and a carrier 8 to which the ring gear 6 is attached, so that the pinion 4 likewise drives the carrier 8. The differential A also includes a bearing arrangement C that supports the carrier 8 in the housing 2. The pinion 4 rotates about a longitudinal axis Y, whereas the ring gear 6 and carrier 8 rotate about a transverse axis X, this rotation being accommodated by the bearing arrangement C which includes two single row tapered roller bearings 10 and 12 mounted in opposition—indeed, in the direct configuration. As such the bearings 10 and 12 confine the carrier 8 and ring gear 6 axially along the transverse axis X, while leaving it free to rotate.

Figure 1:
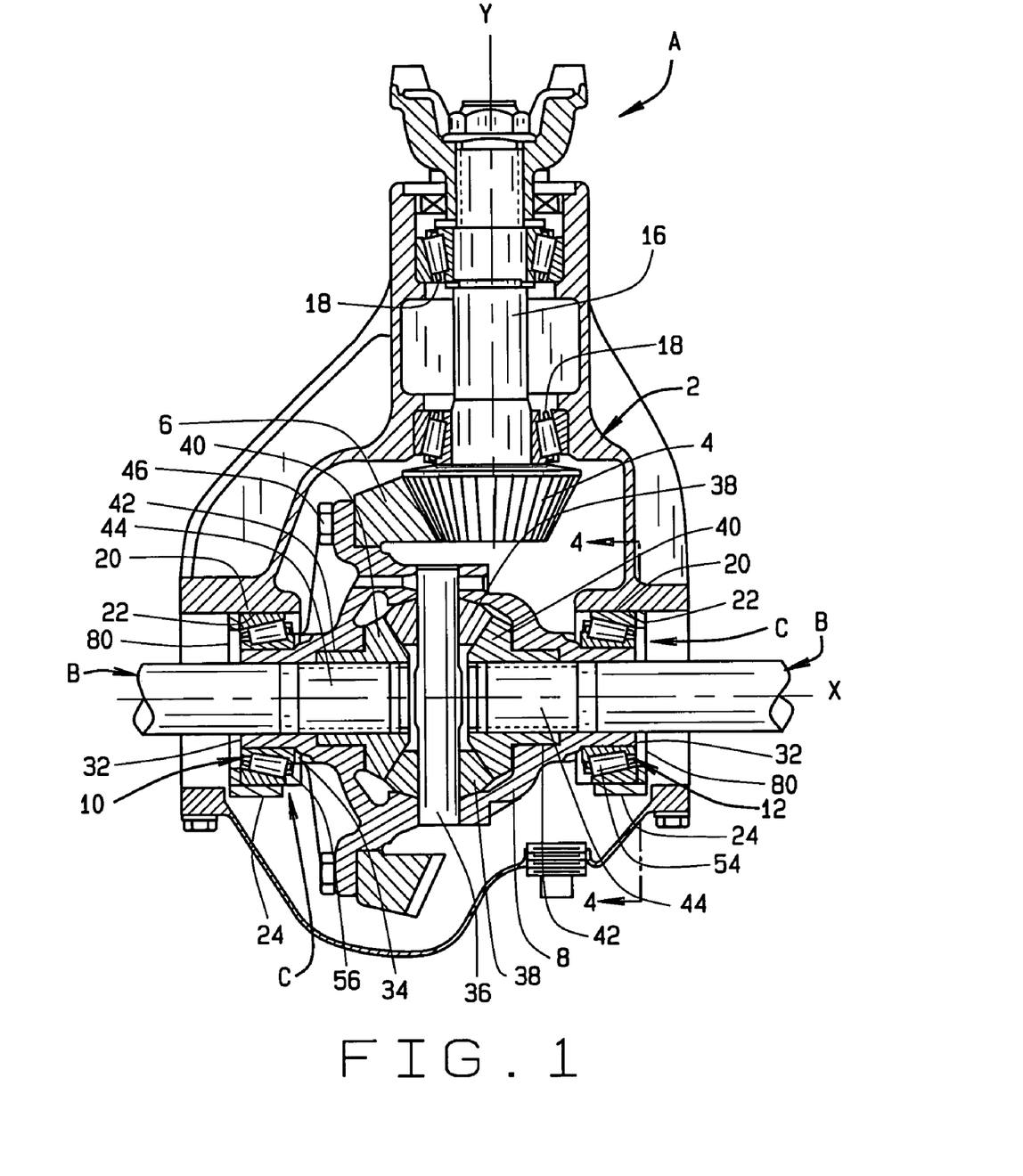
FIG. 1 is a sectional view of an automotive differential provided with a bearing arrangement constructed in accordance with and embodying the present invention.

The pinion 4 lies at the end of a shaft 16 which rotates in bearings 18 mounted in the housing 2. The bearings 18, while permitting the shaft 16 and its pinion 4 to rotate about the axis Y, confine the pinion 4 radially and axially, so that the pinion 4 assumes fixed radial and axial positions along the axis Y.

Along the transverse axis X the housing 2 has two bearing seats 20 (FIG. 4) in the form of half bores 22 which open into the interior of the housing 2 and caps 24 which fit over the half bores 22 and are attached firmly to the housing 2 with cap screws 26. Each half bore 22 contains an internal thread 28 (FIG. 6), which is of uniform diameter and continues into the cap 24 which closes that half bore 22. In other words, the two bearing seats 20 are threaded. Each thread 28 has truncated crests, but its roots are V-shaped. The bearings 10 and 12 fit into the bearing seats 20.

Figure 6:
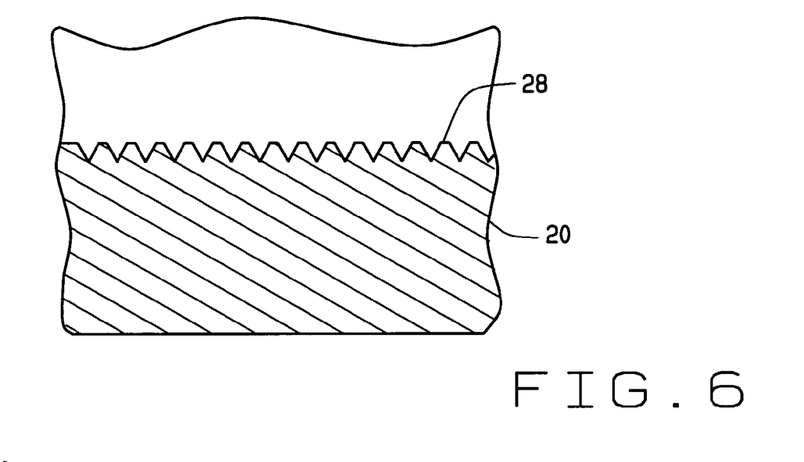
FIG. 6 is a fragmentary sectional view of the seat for one of the carrier bearings.

Of course, the threads 28 of the two bearing seats 20 are cut before the bearings 10 and 12 are installed in those seats 20. To produce the thread 28 in either seat 20, the cap 24 for the seat 20 is secured in the housing 2 with the cap screws 26. Then a boring tool having a diameter corresponding to the diameter of the truncated crests on the thread 28 is run through the half bore 22 and cap 24 in which the seat 20 is to be formed. Next the thread 28 is cut.

The carrier 8 occupies the interior of the housing 2 where it is supported by the bearing arrangement C that includes the bearings 10 and 12 (FIG. 1). They enable the carrier 8 to rotate in the housing 2 about the axis X, yet confine it axially in the housing 2. To this end, the carrier 8 has stub shafts 32, also known as ring gear shafts, which project from shoulders 34 into the bearing seats 20 and into the bearings 10 and 12 in those seats 20.

Between its two stub shafts 32, the carrier 8 has (FIG. 1) a cross shaft 36, the axis of which is perpendicular to the axis X. The cross shaft 36 carries bevel gears 38 which mesh with more bevel gears 40, with the latter having journals 42 that project into the carrier 8 where they are free to rotate about the axis X. The journals 42 are hollow and receive the axle shafts B, with the journals 42 and the shafts B being engaged at mating splines 44.

The ring gear 6 is attached to the carrier 8 with cap screws 46. It meshes with the pinion 4. When the pinion shaft 16 rotates, it drives the carrier 8 through the meshed pinion 4 and ring gear 6, and the carrier 8 revolves about the axis X. The cross shaft 36 rotates with the carrier 8 and through the meshed bevel gears 38 and 40 rotates the axles shafts B. Normally the two axle shafts B rotate at the same angular velocity, but the arrangement permits one to revolve at a different velocity than the other.

Each bearing 10 and 12 includes (FIG. 3) an outer race in the form of a cup 50, an inner race in the form of a cone 52 located within the cup 50, and rolling elements in the form of tapered rollers 54 arranged in a row between the cup 50 and cone 52. Each bearing 10 and 12 also includes a cage 56 in its row of tapered rollers 54 to maintain the correct spacing between the rollers 54. The axes of the two bearings 10 and 12 coincide with the axis X.

Figure 3:
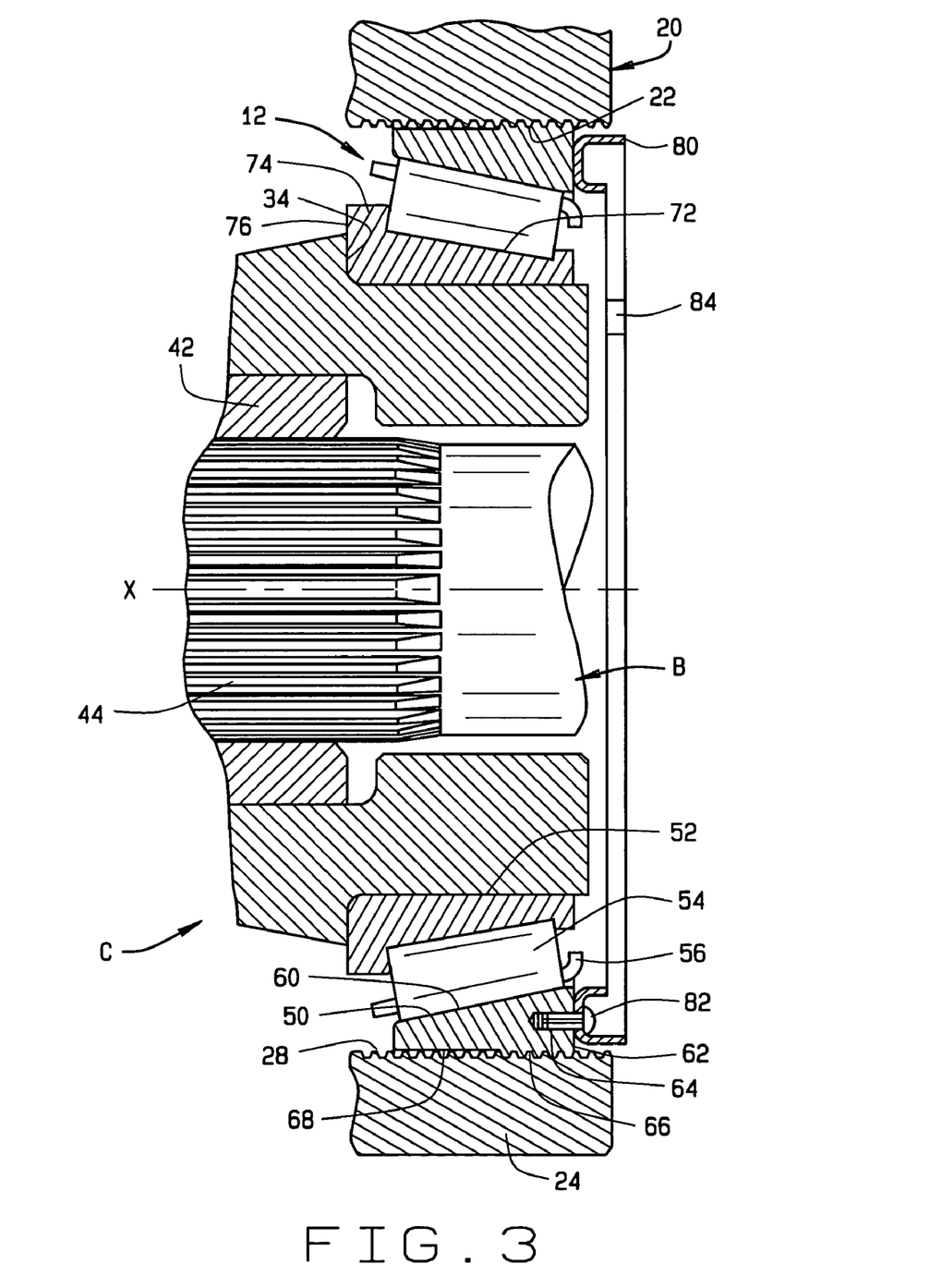
FIG. 3 is a sectional view at one of the bearings that form part of the bearing arrangement representing the present invention.
Figure 5:
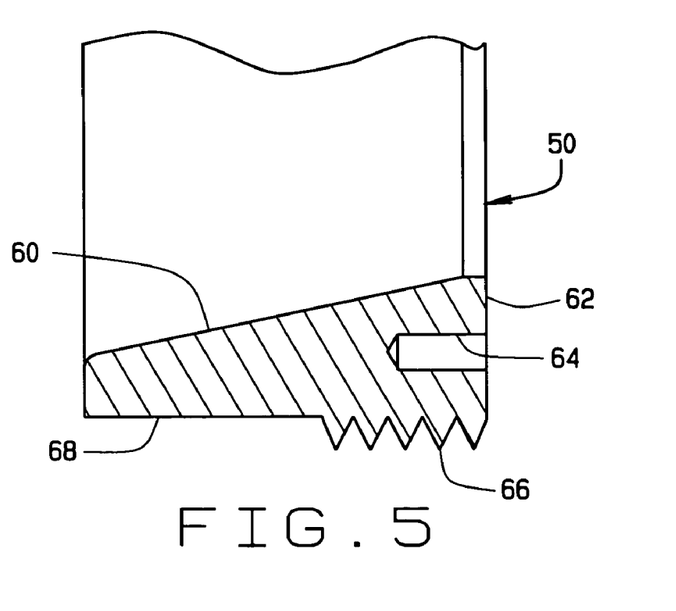
FIG. 5 is a fragmentary sectional view of the cup for one of the carrier bearings of the bearing arrangement.

The cup 50 of each bearing 10 and 12 has a tapered raceway 60 which is presented inwardly toward the axis X and a back face 62 at the small end of the raceway 60. The back face 62 lies perpendicular to the axis X and out of it open several axially directed holes 64. Along its outwardly presented surface, that is its OD, the cup 50 has a thread 66 and a smooth cylindrical surface 68 beyond the thread 66. The thread 66 occupies between 33% and 50% of the length of the cup 50 and extends from the back face 62 toward the opposite end of the cup 50. It thus encircles the cup 50 at the small end of the tapered raceway 60. The pitch and diameter of the thread 66 correspond to the pitch and diameter of the thread 28 in either of the seats 20 in the sense that the thread 66 will engage the thread 28, although with a slight clearance. Actually, the difference between the pitch diameters of the two threads 28 and 66 should range between 0.0030 and 0.0190 inches. The diameter of the cylindrical surface 68 exceeds the minor or least diameter for the external threads 68 on the cup 50 and is less than the diameter for the internal thread 28 on the bearing seat 20 at the truncated crests of the thread 28. The difference between the diameter of the cylindrical surface 68 and the diameter of the truncated crests for the thread 28 should range between 0.0005 and 0.0030 inches.

Preferably the cups 50 are formed from steel and are induction hardened along their raceways 60, but not elsewhere. Alternatively, the cups 50 could be formed from case carburized steel and the threads 66 hard turned.

The cone 52 for each bearing 10 and 12 lies within the cup 50 for that bearing and has a tapered raceway 72 which is presented outwardly away from the axis X and toward the cup raceway 60. The cone 52 at the large end of its raceway 72 has a thrust rib 74 and at the end of the thrust rib 74 a back face 76 which is perpendicular to the axis X.

The tapered rollers 54 for each bearing 10 and 12 lie in a single row between the raceways 60 and 72 of the cup 50 and cone 52, respectively, for that bearing. They contact the raceways 60 and 72 along their tapered side faces, while their large end faces bear against the thrust rib 74 of the cone 52. The rollers 54 are on apex, meaning that the conical envelopes in which their tapered side faces lie have their apices at a common point along the axis X. The apices for the conical envelopes for the raceways 60 and 72 lie at the same point.

The cone 52 for the bearing 10 fits over the left stub shaft 32 on the carrier 8 (FIG. 1), preferably with an interference fit. Its back face 76 bears against the shoulder 34 from which the stub shaft 32 projects. The cage 56 holds the rollers 54 around the raceways 72 of the cone 52, so that the cone 52 and rollers 54 are installed as a unit known as a cone assembly. The cup 50 for the bearing 10 threads into the left bearing seat 20, its external thread 66 engaging the internal thread 28 of the left seat 20. The cone 52 for the right bearing 12 is installed on the right stub shaft 32 and the cup 50 into the right bearing seat 20 in a like manner. The tapered rollers 54 for the bearing 10 taper downwardly away from the carrier 8 and so do the rollers 54 for the bearing 12. Thus, the tapered rollers 54 for the two bearings 10 and 12 taper in opposite directions such that the bearings 10 and 12 are mounted in the direct configuration.

The cones 52 and their rollers 54, that is, the cone assemblies, need to be installed over the stub shafts 32 before the caps 24 are fitted to the housing 2. Once the cones 52 are fitted to the stub shafts 32, the cups 50 are fitted around the rollers 54 that are located around the cones 52. In other words, the bearings 10 and 12 are installed around the stub shafts 32. With the bearings 10 and 12 fitted to their stub shafts 32, the carrier 8 is lowered into the housing 2 such that the bearings 10 and 12 drop into the half bores 22. Either cup 50 may require a slight rotation clockwise or counterclockwise to insure that the thread 66 on it engages the thread 28 of the half bore 22 in which the cup 50 locates. A fixture may be used to hold the cups 50 in place, thus insuring that the bearings 10 and 12 remain with the carrier 8 as it is lowered into the housing 2.

Figure 4:
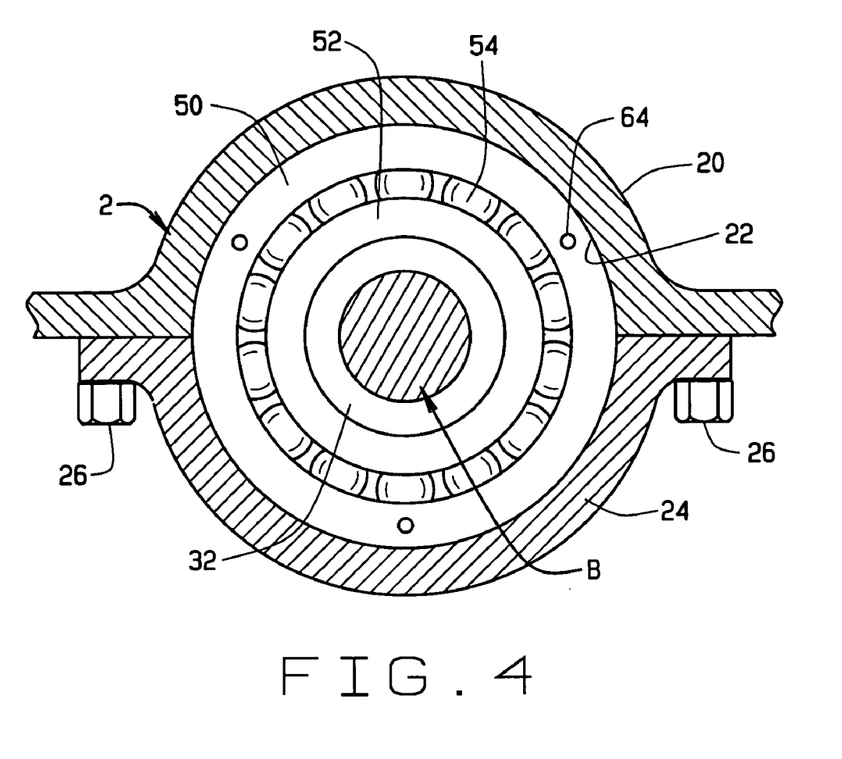
FIG. 4 is a fragmentary sectional view taken along line 4-4 of FIG. 1.

Next the caps 24 are fitted to the housing 2 over the half bores 22 and the threads 28 in the caps 24 likewise engage the threads 66 of the cups 50. The caps 24 are secured with the cap screws 26 (FIG. 4). This completes the bearing seats 20, and they encircle the two bearings 10 and 12.

Thereupon, the bearings 10 and 12 are adjusted. To this end, the cups 50 are advanced and retracted in their bearing seats 20 by rotating them. They are positioned such that the bearings 10 and 12 possess a light preload, and such that the correct mesh exists between the pinion 4 and the ring gear 6. The spacing between the two cups 50 controls the setting for the bearings 10 and 12. The lateral positions of the two bearings 10 and 12 along the axis X in the housing 2 controls the mesh setting. The adjustments for both settings are effected by rotating the cups 50 in their respective bearing seats 20.

Figure 7:
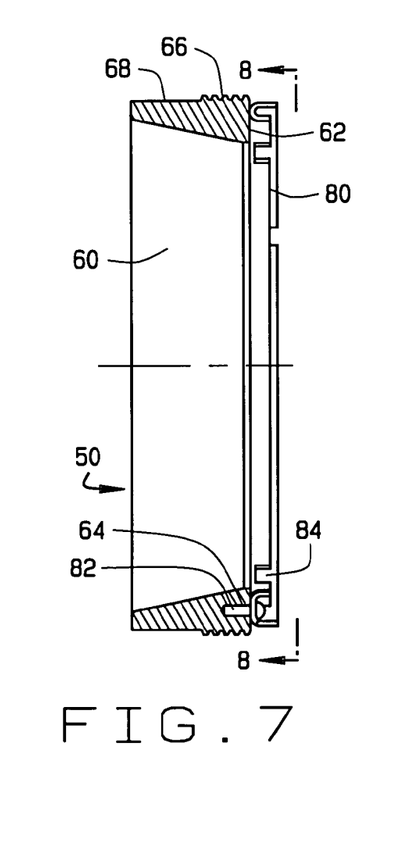
FIG. 7 is a sectional view of the cup for one of the carrier bearings with a locking ring attached to the cup.
Figure 8:
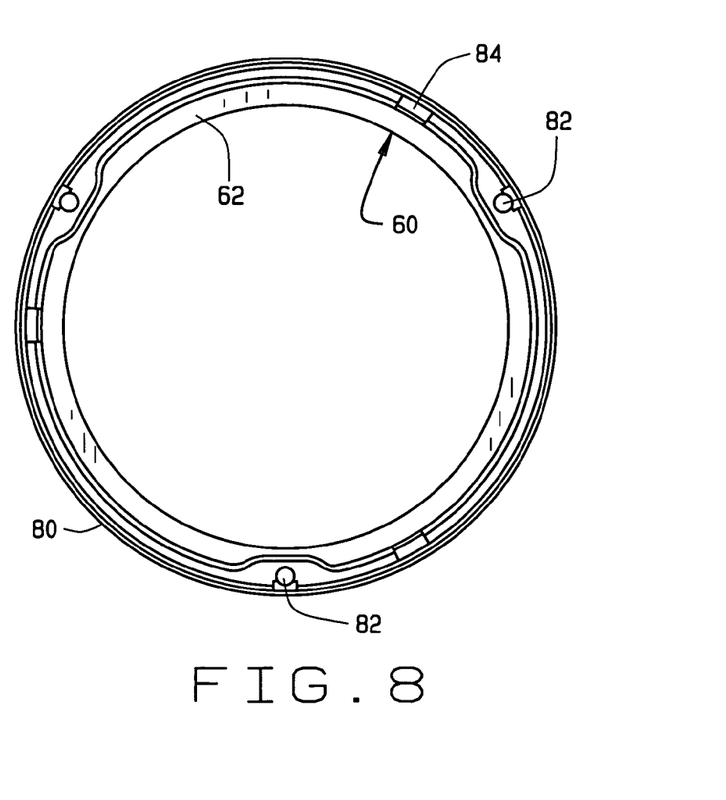
FIG. 8 is an end view of the locking ring and cup taken along line 8-8 of FIG. 7.

In this regard, the cup 50 of each bearing 10 and 12, before it installed over its cone 52 and rollers 54, is fitted with a locking ring 80 (FIGS. 7 & 8), which may be formed as a sheet metal stamping. It may assume any of a variety of configurations. Moreover, it may be attached to the cup by a variety of methods, including, welding adhesives, screws, pins, and the like, at a variety of locations, including the back face 62, the front face, or the cylindrical surface 68. In one configuration, the ring 80 has drive studs 82 projected axially from one of its faces, and these drive studs 82 align with the holes 64 that open out of the back face 62 of the cup 50 to which the ring 80 is attached. The drive studs 82 fit tightly into the holes 64, into which they are forced, and this secures the locking ring 80 to the cup 50. The locking ring 80 has notches 84 which are arranged at equal circumferential intervals and are exposed beyond the back face 62 of the cup 50, all to provide formations which may be engaged to turn the cup 50. The locking ring 80 remains with the cup 50 and is configured to be engaged by an adjustment tool D.

The tool D (FIG. 9) takes the form of a disk having tabs 86 along its periphery and a drive socket 88 at its center. It is configured to fit over or into the locking ring 80 with its tabs 86 received in the notches 84, so that disk 90 and ring 80 are engaged and will rotate in unison. This rotation may be effected by a wrench that engages the tool at its drive socket 88. Indeed, the tool D is engaged with the ring 80 on each cup 50, and the cups 50 are rotated with the tool D to give the bearings 10 and 12 the proper setting and to establish the correct mesh setting for the pinion 4 and ring gear 6.

Figure 9:
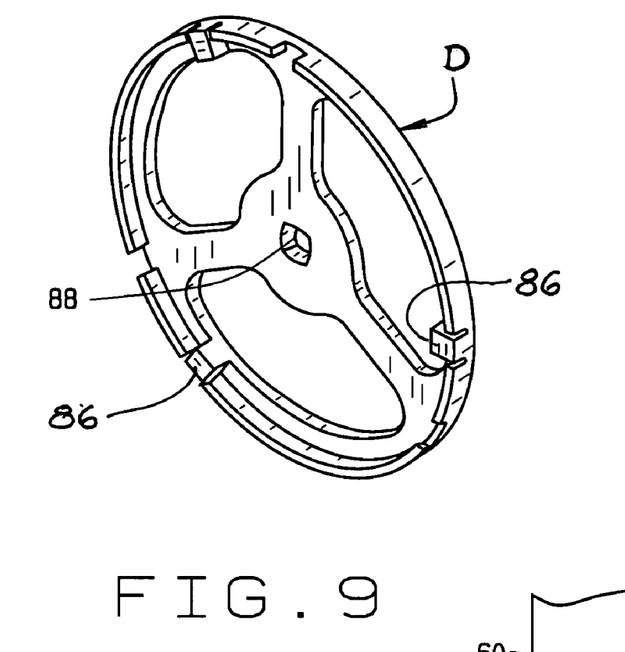
FIG. 9 is a perspective view of an adjustment tool capable of engaging a locking ring of either carrier bearing and rotating it and the cup to which it is attached.

While serving to couple the tool D to the cups 50 so as to adjust the location of the bearings 10 and 12 along the axis X, the locking rings 80 serve the equally important function of securing the cups 52 against rotation once they are rotated to the correct positions in their respective bearing seats 20. To this end, the locking ring 80 for each cup 50, being formed from sheet metal, may be easily deformed into a recess or other cavity in the bearing seat 20, thereby preventing its rotation and rotation of the cup 50 within the seat 20.

The fit between the cylindrical surface 68 of each cup 50 and the truncated crests of the thread 28 for the seat in which that cup 50 is contained is tighter than the fit between the thread 66 in the cup 50 and the thread 28 of the ring seat 20. More specifically, the clearance between the truncated crests of the internal thread 28 and the cylindrical surface 68 of the cup 50 is less than the difference between the pitch diameters of the internal thread 28 of the ring seat 20 and the external thread 66 on the cup 50, the former being larger than the latter. The arrangement is such that radial and tilting loads transfer from the carrier 8 to the housing 2 through the cylindrical surfaces 68 on the two cups 50. Axial or thrust loads, on the other hand, transfer between the carrier 8 and housing 2 through the engaged threads 28 and 66 on the two bearing seats 20 and cups 50. The difference in the fit between the pitch diameters and between the cylindrical surface 68 and the crest of the threads 28 should range between 0 and 0.0185 inches.

Figure 10:
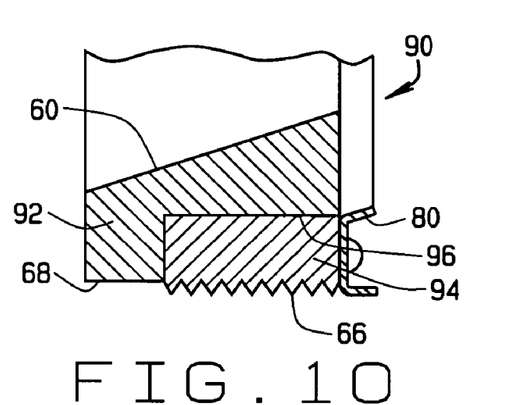
FIG. 10 is a fragmentary sectional view of a alternate cup for a carrier bearing.

The cups 50 for the two bearings 10 and 12 have a one-piece construction in which the threads 66 for each cup 50 are an integral part of the cup 50. An alternate cup 90 (FIG. 10) consists of two elements—a major element 92, on which the raceway 60, back face 62, and cylindrical surface 68 exist, and a ring 94 on which the thread 66 exists. Beyond the cylindrical surface 68, the alternate cup 90 has an annular relief 96 in the form of a rabbet. The ring 94 fits in the relief 96 with its thread 66 projecting beyond the cylindrical surface 68 on the major element 92. The locking ring 80 is attached to the ring 94. The ring 94 may be secured to the major element 92 with an interference fit or by a weld or both.

Figure 11:
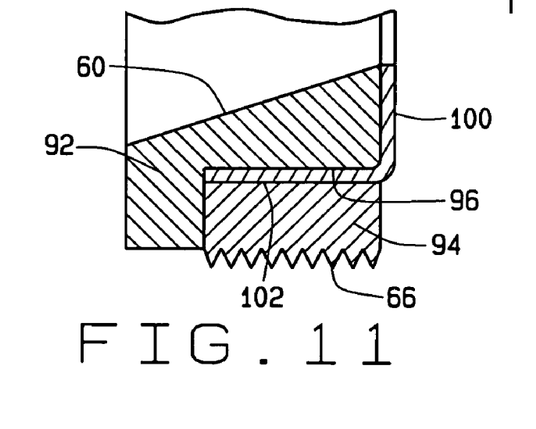
FIG. 11 is a fragmentary sectional view of another alternate cup for a carrier bearing.

An alternate locking ring 100 (FIG. 11) may be fitted to the alternate cup 90. To this end, the alternate locking ring 100 has an axially directed wall 102 which fits into the relief 96 and is encircled by the threaded ring 94, so that the wall 102 is captured between the ring 94 and the major component 92. Interference fits exist so that the component 92, threaded ring 94, and locking ring 100 are all held firmly together.

Other variations are available as well. For example, the internal thread 28 of each bearing seat 20 need not extend the full length of the seat 20, but instead may lead up to a smooth cylindrical surface. That surface would lie opposite cylindrical surface 68 of the cup 50 or 90 that locates with the seat 20. The threads 28 and 66 in the bearing seats 20 and on the cups 50, respectively, are actually helices, and other forms of helices may be used, such as ball screws. Also, other bearings with inclined raceways—for example, angular contact ball bearing—may be substituted for the tapered roller bearings 10 and 12. In that event, the outer races of the substituted bearings would have threads 66 and cylindrical surfaces 68.

The seats 20 with their threads 28 and the cups 50 with their mating threads 66, enable the differential A to occupy less width than its counterparts provided with conventional cup adjustors. Also, the differential A requires fewer parts and is easier to assemble. Less weight accompanies the lesser width and reduced part count. In addition, the cups 50 do not rotate in the housing 2, and this prevents wear in the bearing seats 20 and on the cups 50, thus extending the life of the differential A beyond its conventional counterparts.

The invention claimed is:

1. A differential for an automotive vehicle, said differential comprising:
    a housing containing a bearing seat that is located along an axis; the bearing seat having an internal thread provided with multiple crests;
    a carrier that rotates in the housing about the axis for distributing torque to two axle shafts while accommodating for variations in velocity between the axle shafts; and
    an antifriction bearing supporting the carrier in the housing, the bearing including
        an inner raceway carried by the carrier and being presented away from and inclined with respect to the axis;
        an outer race located in the bearing seat and having a raceway that is presented inwardly toward the inner raceway and is inclined with respect to the axis in the same direction as is the inner raceway, the outer race having an external thread that is engaged with the internal thread of the bearing seat and a cylindrical surface that lies along multiple crests for the internal thread of the bearing seat, and
        rolling elements located between the inner raceway and the outer raceway of the outer race.

2. A differential according to claim 1 wherein a clearance fit exists between the crests of the internal thread in the bearing seat and the cylindrical surface of the outer race.

3. A differential according to claim 2 wherein the crests of the internal thread in the bearing seat are truncated.

4. A differential according to claim 2 wherein the threads on the outer race project outwardly beyond the cylindrical surface on the outer race.

5. A differential according to claim 4 wherein the pitch diameter of the internal thread of the bearing seat is slightly greater than the pitch diameter of the external thread on the outer race, whereby a clearance fit exists between the threads.

6. A differential according to claim 5 wherein the fit between the cylindrical surface of the outer race and the crests of the internal threads in the bearing seat is equal to or tighter than the clearance fit between the external threads on the outer race and the internal threads of the bearing seat.

7. A differential according to claim 1 wherein the inner and outer raceways are tapered and the rolling elements are tapered rollers.

8. A differential according to claim 7 wherein the outer race has ends toward which its raceways extend; and wherein the external thread is at the end of the outer race where the tapered outer raceway is smallest and the cylindrical surface is at the end of the outer race where the tapered outer raceway is largest.

9. A differential according to claim 8 wherein the thread occupies between about 33% and 50% of the axial length of the outer race.

10. A differential according to claim 7 wherein both the external thread and the cylindrical surface of the outer race surround the outer raceway or the outer race.

11. A differential according to claim 1 wherein the outer race comprises a major element on which the raceway and cylindrical surface of the outer race exist, and a ring that occupies an annular relief in the major element the thread of the outer race being located on the ring.

12. A differential for distributing torque between two axle shafts, said differential comprising:
   a housing containing bearing seats that are spaced apart along an axis, the bearing seats having internal threads provided with multiple crests;
   a differential carrier being configured to deliver torque to the axle shafts;
   a ring gear attached to the carrier for delivering torque to the carrier; and
   antifriction bearings located within the bearing seats and round the stub shafts for supporting the carrier in the housing and enabling it to rotate about the axis, the bearing within each bearing seat and around the stub shaft in that seat including:
      an inner race located around the stub shaft and having a raceway that is presented away from and inclined with respect to the axis;
      an outer race that is located within the bearing seat and having an outer raceway that is presented toward the inner raceway and is inclined in the same direction as the inner raceway, the outer race also having an external thread and a cylindrical surface located axially beyond the external thread, the external thread being engaged with the internal thread of the bearing seat so that the axial position of the outer race along the axis may be altered by rotating the outer race in the bearing seat, the cylindrical surface lying along the crests of the internal thread of the bearing seat;
      rolling elements located in a row between the inner and outer raceways; and
      the bearings being mounted in opposition, whereby rotation of one outer race relative to the other outer race will change the setting of the bearings.

13. A differential according to claim 12 wherein the diameters of the cylindrical surfaces of the outer races are less than the diameters of the crests on the internal threads along which they extend.

14. A differential according to claim 13 wherein the crests of the internal threads are truncated.

15. A differential according to claim 13 wherein the external threads on the outer races project radially beyond the cylindrical surfaces of the outer races.

16. A differential according to claim 15 wherein the fit between the cylindrical surface of each outer race and the crests of the internal thread in the bearing seat for that race is equal to or tighter than the fit between the external thread on that outer race and the internal thread of the bearing seat.

17. A differential according to claim 13 wherein the pitch diameter of the internal thread of each bearing seat is slightly greater than the pitch diameter of the external thread on the outer race that threads into that seat.

18. A differential according to claim 12 wherein the ring gear is beveled; and further comprising a beveled pinion that is rotatable in the housing and is engaged with the beveled ring gear, whereby the axial position of the carrier and the mesh between the ring gear and the pinion is controlled by rotating the outer races of the bearings in their bearing seats.

19. A differential according to claim 12 wherein the raceways of the bearings taper, and the rolling element are tapered rollers.

20. A differential according to claim 19 wherein on each outer race both the external thread and the cylindrical surface surround the raceway of the race.

21. A differential for an automotive vehicle, said differential comprising:
   a housing having two spaced apart bearing seats that are aligned along an axis, each bearing seat having an internal thread provided with multiple crests;
   a carrier located in the housing generally between the bearing seats and having stub shafts that project into the bearing seats;
   a ring gear on the carrier; and
   a single row tapered roller bearing supporting the carrier in the housing at each of the stub shafts such that the carrier can rotate about the axis, but is confined axially, each bearing including:
      a cup located in the bearing seat for its bearing and having a tapered raceway that is presented inwardly toward the axis, the cup also having an external thread that engages the internal thread of its bearing seat and an external cylindrical surface that lies along the crests of the internal thread of its bearing seat;
      a cone located around the stub shaft that projects into the seat and having a tapered raceway that is presented outwardly away from the axis and toward the raceway of the outer race;
      and tapered rollers arranged in a single row between the cup and cone and contacting the raceways of the cup and cone;
      the bearings being mounted in opposition so that the raceways of the one bearing taper in one direction and the raceways of the other bearing taper in the opposite direction, whereby the setting of the bearings and the axial position of the ring gear can be adjusted by rotating the cups.

22. A differential according to claim 21 wherein the diameter of the crests on the internal thread of each bearing seat is greater than the diameter of the cylindrical surface of the cup that fits into the bearing seat.

23. A differential according to claim 22 wherein the pitch diameter for the internal thread of each bearing seat is greater than the pitch diameter of the external thread on the cup that is in the bearing seat.

24. A differential according to claim 23 wherein the difference between the diameter of the crests on the internal thread and the diameter of the cylindrical surface is equal to or less than the difference between the pitch diameters of the external and internal threads.

25. A differential according to claim 23 wherein the fit between the crests of the internal thread of each bearing seat and the cylindrical surface of the cup in that bearing seat is equal to or tighter than the fit between the internal thread of the bearing seat and the external thread of the cup.

26. A differential according to claim 22 wherein the crests of the internal thread in each bearing seat are truncated.

27. A differential according to claim 21 wherein the bearings are mounted with the large ends of the tapered rollers in the bearings being presented toward each other.

28. A differential according to claim 21 wherein each bearing seat includes a half bore in the housing and an initially separate cap covering the half bore, and the internal thread for the bearing seat is in the half bore and in the cap.

29. A differential according to clam 21 and further comprising a locking ring attached to each cup and being engageable with the housing to prevent the cup from rotating within the housing.

30. A differential according to claim 29 wherein the locking ring is a metal stamping, has formations that are engageable by a tool, and is deformed into engagement with the housing.

31. A differential according to claim 21 wherein the cup of each bearing has a back face at the small end of its raceway, with the back face being located at a substantial angle with respect to the raceway of the cup and with respect to the axis; and wherein each bearing further comprises a ring attached to its cup along the back face of the cup, the ring having at least one formation which enables a tool to engage the ring, so that the tool can rotate the ring and the cup.

32. A differential according to claim 31 wherein the ring is attached to the cup at the back face of the cup by means selected from a group consisting of a weld, pins, screws, and an adhesive.

* * * * *